United States Patent [19]

Hendriks

[11] Patent Number: 5,145,465

[45] Date of Patent: Sep. 8, 1992

[54] METHOD OF CONTROLLING THE TENSION IN A DRIVING BELT OF A CONTINUOUSLY VARIABLE TRANSMISSION

[75] Inventor: Emery F. M. Hendriks, Heeze, Netherlands

[73] Assignee: Van Doorne's Transmissie B.V., Tilburg, Netherlands

[21] Appl. No.: 640,441

[22] Filed: Jan. 11, 1991

[30] Foreign Application Priority Data

Jan. 11, 1990 [NL] Netherlands .................. 9000075

[51] Int. Cl.$^5$ .................................... F16H 7/08
[52] U.S. Cl. ................................. 474/101; 474/109
[58] Field of Search ................ 474/101, 8, 11, 12, 474/17, 69, 70, 109, 75

[56] References Cited

U.S. PATENT DOCUMENTS 4,511,348 4/1985 Witdoek et al. .................. 474/109
4,992,066 2/1991 Watson ............................ 474/101 X

*Primary Examiner*—Thuy M. Bui
*Attorney, Agent, or Firm*—Pennie & Edmonds

[57] ABSTRACT

A continuously variable transmission system having a primary pulley, a secondary pulley, a driving belt disposed therebetween, and a torque converter disposed between an engine and the primary pulley. The pulleys each have discs movable by applying an hydraulic pressure to control the tension in the belt such that during acceleration from a stationary position the tension is temporarily increased to a level above a maximally allowable tension being determined on the basis of the statistic average of the expected number of revolutions at the end of the life of the belt.

5 Claims, 1 Drawing Sheet

METHOD OF CONTROLLING THE TENSION IN A DRIVING BELT OF A CONTINUOUSLY VARIABLE TRANSMISSION

BACKGROUND OF THE TRANSMISSION

The invention relates to a method of controlling the tension in a driving belt of a continuously variable transmission, in particular for a motor vehicle. In such transmission, the driving belt is disposed between a primary pulley and a secondary pulley. Each pulley is provided with two conical discs, at least one of the conical discs being axially movable. The transmission also incorporates a torque converter which on the one side is coupled to the engine and on the other side to said primary pulley. By means of the torque converter, the torque to be generated from a stationary position is temporarily increased.

Such the method is generally know. With the known method and a known continuously variable transmission, a torque converter is generally used for increasing the torque delivered by the transmission when the motor vehicle drives off. Because the increased torque delivered by the torque converter must also be transmitted by the driving belt and, via the secondary pulley and an outgoing shaft, to the wheels of the motor vehicle, the known transmission systems are provided with means which ensure that the maximum tension in the known transmission systems never exceeds an allowable nominal tension which corresponds with a practically infinite life of the driving belt. This is necessary because the life of the driving belt will be limited when the nominal tension is exceeded. Thus the nominal tension is the absolute upper limit, which will not be exceeded in the known practical cases. The drawback of these known systems is that, given the known method and the known transmission systems, the drive-off torque of vehicles provided with such a known transmission is not optimal.

SUMMARY OF THE INVENTION

The object of the invention is to provide a method which makes it possible to use the continuously variable transmission with an optimally increased torque, as a result of which an improved drive-off performance is achieved when employed in motor vehicles.

In order to accomplish that objective the method according to the invention is characterized in that a maximally allowable tension of the driving belt, corresponding with the statistic average of the expected number of revolutions at the end of the life of the driving belt, is determined on the basis of said average, and that during the time span during which acceleration from a stationary position takes place, the inward torque is temporarily increased to such a level that the increased tension in the driving belt corresponding therewith is momentarily brought to a level above the predetermined maximally allowable tension.

In the present invention an important role is played by the understanding that setting an absolute upper limit for the maximally allowable tension in the driving belt, as is done in the known continuously variable transmission, will limit the range of application and the properties of said transmission in inter alia vehicles. This limitation of the range of application and properties is unnecessary when the method according to the invention is employed on the basis of the acquired statistical perception of the strength properties as a function of the life of the driving belt, wherein a momentary increased tension in the driving belt is generated when driving the first few metres with the vehicle from a stationary position, which increased tension would cause the driving belt to break too fast when being applied for a prolonged period, but which provides the vehicle with an additional torque when being applied for a relatively short period, namely when accelerating from a stationary position, as a result of which the vehicle will have improved drive-off properties. By using the method according to the invention the range of application of the continuously variable transmission has been substantially widened.

One embodiment of the method according to the invention is characterized in that the aggregate of the time spans during which the tension in the driving belt is increased to a level above the maximally allowable tension, amounts to no more than two percent of the statistical life of the driving belt, and preferably to a half per cent.

Experiments have shown that when the actual tension in the driving belt is increased to a level above the maximally allowable tension for a period amounting to two per cent of the total life of the driving belt, the eventual reduction in the expected life was entirely acceptable in practice.

In order to optimally utilize the capacity of in particular the driving belt a further embodiment of the method according to the invention is characterized in that the maximally allowable tension in the driving belt is higher than the nominal tension of the driving belt at which statistically the life of the driving belt will be substantially infinite.

DESCRIPTION OF THE PREFERRED EMBODIMENT

Figure 1:
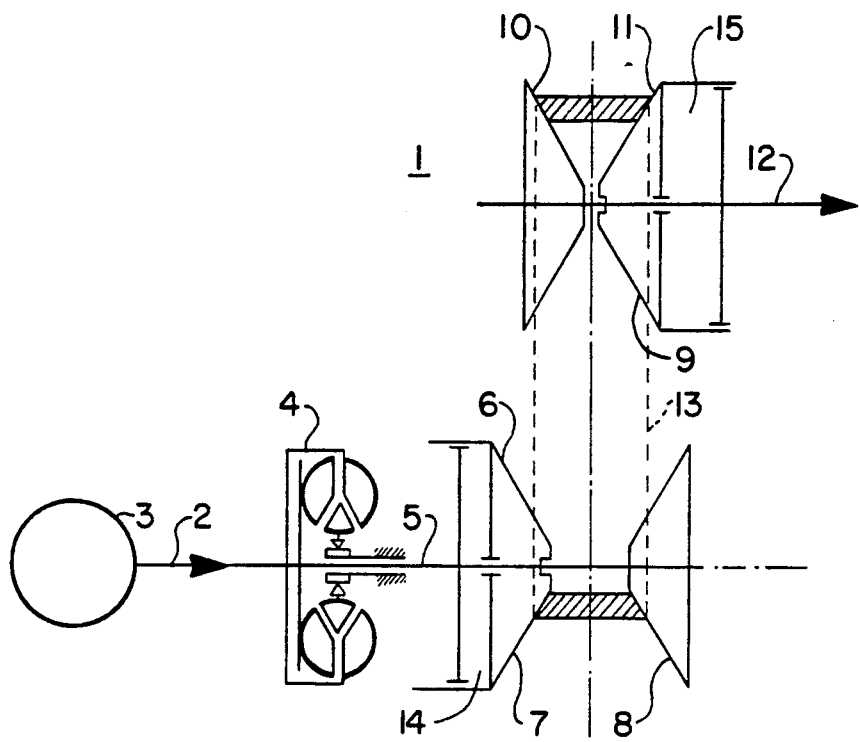
FIG. 1 is a schematic representation of the continuously variable transmission with a torque converter.

FIG. 1 schematically represents a continuously variable transmission system 1. Said system 1 comprises an engine 3 connected to an ingoing shaft 2, to which ingoing shaft 2 a torque converter 4 is connected. Said torque converter 4 is furthermore coupled to a primary shaft 5, to which a primary pulley 6 is connected, said pulley having two conical discs 7 and 8. The system 1 furthermore comprises a secondary pulley 9 with conical discs 10 and 11, said pulley 9 being connected to an outgoing shaft 12, which is coupled to wheels (not shown) of a vehicle. A driving belt 13 is disposed between the primary pulley 6 and the secondary pulley 9. The respective radii of the path of the driving belt 13 between the pulleys 6 and 9 can be influenced by axially moving the axially movable discs 7 and 11. Said discs 7 and 11 can be axially moved by exerting a hydraulic pressure in hydraulic cylinders 14 and 15 connected to said two discs. By moving the disc 7 the transmission ratio of the transmission system is influenced, and by moving the disc 11 the tension at which the driving belt 13 runs between the pulleys 6 and 9 is influenced. The control system for influencing the hydraulic pressures in the cylinders 14 and 15 does not form part of the subject matter of the present invention. The torque delivered to the ingoing shaft 2 by the engine 3 is increased by the torque converter 4 upon acceleration of the vehicle. Said increased torque is transmitted to the primary pulley 6 via the primary shaft 5 and to the secondary pulley 9 and the outgoing/secondary shaft 12 via the driving belt 13.

Figure 2:
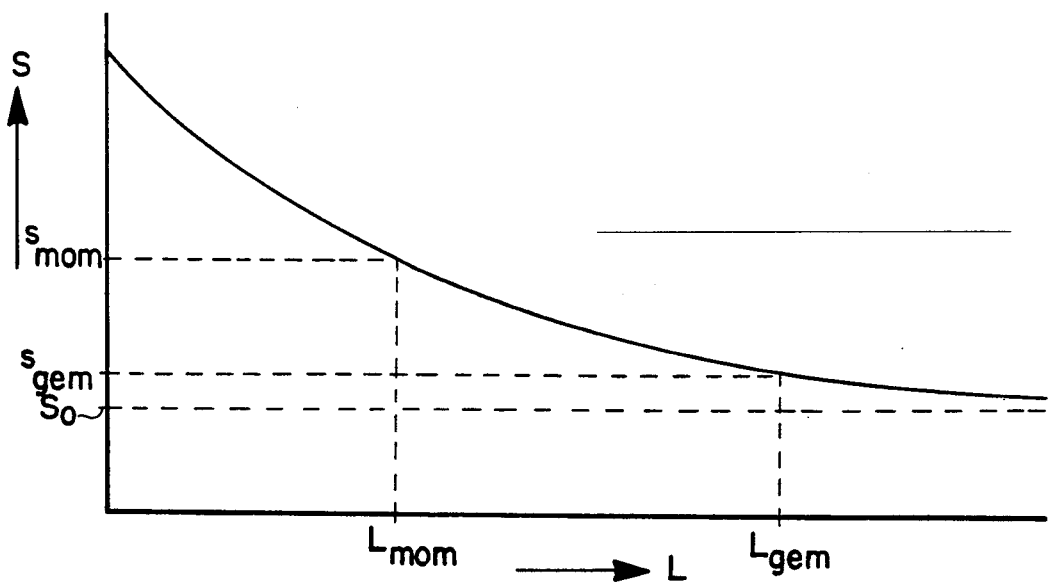
FIG. 2 is a graphical illustration of a so-called Wöhler-curve, in which the tension of the driving belt is set off along the vertical axis and the expected number of revolutions of the driving belt which are proportional to the life of the driving belt is set off along the horizontal axis.

FIG. 2 shows a Wöhler-curve, wherein the tension (S) in the driving belt 13 is set off along the vertical axis and the expected life (L) associated with said tension is set off along the horizontal axis. The life may also be considered to be expressed in the number of revolutions of the driving belt expected at the end of the life of the driving belt with a certain tension. The curve S as a function of L has been determined on the basis of statistical data of a group of driving belts. A point located above this drawn curve indicates that with a given average tension in the driving belt the life associated with that point cannot be achieved, because the average driving belt will already have broken at that point. With a point located under the curve, with the tension in question, the driving belt will still be intact after the associated life and the total number of revolutions associated therewith have elapsed.

In general the tension in the driving belt in the known systems will not exceed So, because with this tension and below said tension the life of the driving belt will be substantially infinite. Known systems control the tension in the driving belt 13 up to the maximum So. FIG. 2 indicates a tension Sgem, which is higher than So and which is associated with an expected life indicated by Lgem. A finite life Lgem is thus associated with such a tension Sgem in the driving belt. Said increase of the average tension Sgem with respect to So is caused by the momentary increase of the torque, i.e. that time spans may be indicated during which the torque to be transmitted by the transmission 1 runs up to such a high level that when the system is continuously operated at such a tension Smom the life of the system Lmom will be limited too much. However, by increasing the tension to Smom only during the first few metres, when driving off from a stationary position of the vehicle, the average life on the basis of the aggregate of tensions is indeed slightly reduced, but in practice an entirely acceptable, although finite, life Lgem of the driving belt is obtained. A further advantage is that when the transmission 1 is arranged in the known manner a more powerful engine 3 may be coupled to said transmission than before, whereby said more powerful engine, as a result of the increased torque which can be transmitted with the tension momentarily increased to Smom, enables the vehicle to drive off and accelerate from a stationary position better than before. When the above-described method with a momentarily increased tension in the driving belt is used the range of application and the freedom of application of the transmission described is considerably increased.

Preferably a method is used wherein the tension is increased to Smom during preferably only a half percent and no more than two per cent of the entire operating time. The reduction of the eventually expected life as a result of this aggregate of tensions is so small that in practice this can be called entirely acceptable.

In particular a torque converter is selected whose converting factor lies between 1.5-2. When the torque converter 4 is provided with lock-up means, which are not shown but which are generally known, by means of which the torque converter is bridged when the speed of the vehicle is about 20 kilometers per hour, the result is that the tension is momentarily increased during the first three seconds, when accelerating from a stationary position.

I claim:

1. In a method of controlling the tension in a driving belt of a continuously variable transmission, in particular for a motor vehicle having a rotating drive shaft, in which said driving belt has a maximally allowable tension corresponding with the statistic average of the expected number of revolutions at the end of the statistical finite life of the driving belt and in which said driving belt is disposed between a primary pulley and a secondary pulley, which are each provided with two conical discs, at least one of said conical discs being axially movable, and which transmission incorporates a torque converter which is coupled to the engine and to said primary pulley, by means of which torque converter the torque to be generated from a stationary position of the rotating drive shaft of said motor is controllable, the improvement comprising the step of temporarily increasing the torque during the time span during which acceleration of the drive of said motor from a stationary position takes place, to such a level that the increased tension in the driving belt corresponding therewith is momentarily brought to a level above said predetermined maximally allowable tension.

2. Method according to claim 1, characterized in that increasing the tension in the driving belt to a level above the maximally allowable tension over a plurality of time spans which amount to no more than two per cent of the statistical finite driving life of the driving belt, and preferably to a half per cent.

3. Method according to claim 1 or 2, characterized in that the maximally allowable tension in the driving belt is higher than the nominal tension of the driving belt at which statistically the life of the driving belt will be substantially infinite.

4. Method according to claim 1 or 2, further including the step of applying said torque at a converting factor between 1.5-2.

5. Method according to claim 4, further including the step of bridging the torque converter when the speed of the vehicle becomes higher than about 20 kilometers per hour.

* * * * *